(12) United States Patent
Abe et al.

(10) Patent No.: US 10,677,327 B2
(45) Date of Patent: Jun. 9, 2020

(54) TOROIDAL CONTINUOUSLY VARIABLE TRANSMISSION

(71) Applicant: KAWASAKI JUKOGYO KABUSHIKI KAISHA, Kobe-shi, Hyogo (JP)

(72) Inventors: Akihito Abe, Kobe (JP); Kenichiro Tanaka, Kobe (JP); Hideyuki Imai, Akashi (JP); Tatsuhiko Goi, Kobe (JP); Isao Fujii, Kakogawa (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 912 days.

(21) Appl. No.: 15/290,070

(22) Filed: Oct. 11, 2016

(65) Prior Publication Data

US 2017/0030438 A1 Feb. 2, 2017

Related U.S. Application Data

(63) Continuation of application No. PCT/JP2015/061394, filed on Apr. 13, 2015.

(30) Foreign Application Priority Data

Apr. 14, 2014 (JP) ................. 2014-082827

(51) Int. Cl.
*F16H 15/38* (2006.01)
*F16C 19/54* (2006.01)
*F16H 37/02* (2006.01)

(52) U.S. Cl.
CPC ........... *F16H 15/38* (2013.01); *F16C 19/541* (2013.01); *F16H 37/021* (2013.01); *F16C 2361/00* (2013.01); *F16H 2015/383* (2013.01)

(58) Field of Classification Search
CPC ........ F16H 15/38; F16H 37/021; F16H 55/02; F16H 55/14; F16H 55/17; F16H 2015/383; G01M 1/30; G01M 1/36; G01M 1/38
(Continued)

(56) References Cited

U.S. PATENT DOCUMENTS 3,826,147 A  7/1974 Sharpe et al.
5,779,591 A  7/1998 Inoue
(Continued)

FOREIGN PATENT DOCUMENTS

CN  201982607  *  9/2011
CN  207964167  *  10/2018
(Continued)

OTHER PUBLICATIONS

Machine Translation of CN 201982607, 3 pages.*
(Continued)

*Primary Examiner* — William C Joyce
(74) *Attorney, Agent, or Firm* — Sughrue Mion, PLLC

(57) ABSTRACT

In a toroidal continuously variable transmission including at least one transmission unit including: an input disc and an output disc disposed coaxially; and a power roller tiltably interposed between the input disc and the output disc and configured to transmit a driving force from the input disc to the output disc, an integrally rotating member disposed so as to be spaced apart in an axial direction from at least one disc of the input disc and the output disc of each transmission unit and configured to rotate together with the at least one disc, and an annular interposed member provided between the at least one disc and the integrally rotating member and configured to rotate together with the at least one disc, are provided, and the interposed member is formed with a
(Continued)

balance adjustment portion capable of adjusting weight balance in a circumferential direction.

10 Claims, 7 Drawing Sheets

(58) Field of Classification Search
USPC .......................... 83/468, 470; 476/40, 42, 46
See application file for complete search history.

(56) References Cited

U.S. PATENT DOCUMENTS

| | | | | |
|---|---|---|---|---|
| 5,984,827 | A | * | 11/1999 | Yamamoto .............. F16H 15/38 476/70 |
| 6,383,113 | B1 | | 5/2002 | Döppling et al. |
| 6,659,907 | B2 | | 12/2003 | Hirano et al. |
| 6,666,791 | B1 | | 12/2003 | Greenwood |
| 7,950,280 | B2 | * | 5/2011 | Haimer ................... G01M 1/36 73/470 |
| 2002/0028723 | A1 | | 3/2002 | Hirano et al. |

FOREIGN PATENT DOCUMENTS

| | | | |
|---|---|---|---|
| DE | 10 2008 052 093 | * | 4/2010 |
| JP | 09-177918 A | | 7/1997 |
| JP | 2002-081519 A | | 3/2002 |
| JP | 2002512349 A | | 4/2002 |
| JP | 2002538394 A | | 11/2002 |
| JP | 2005-090633 A | | 4/2005 |
| JP | 2007-113593 A | | 5/2007 |
| WO | 0052358 A1 | | 9/2000 |

OTHER PUBLICATIONS

Communication dated Jul. 4, 2017, from the Japanese Patent Office in counterpart application No. 2016-513782.
International Preliminary Report on Patentability issued from the International Bureau in counterpart International Application No. PCT/JP2015/061394, dated Oct. 27, 2016.
Communication dated Aug. 8, 2017 issued by the Canadian Intellectual Property Office in counterpart application No. 2,945,465.
International Search Report of PCT/JP2015/061394 dated Jul. 14, 2015.
Communication dated Nov. 7, 2017, from the European Patent Office in counterpart European Application No. 15780298.4.

\* cited by examiner

TOROIDAL CONTINUOUSLY VARIABLE TRANSMISSION

CROSS REFERENCE TO THE RELATED APPLICATION

This application is a continuation application, under 35 U.S.C. § 111(a), of international application No. PCT/JP2015/061394, filed Apr. 13, 2015, which claims priority to Japanese patent application No. 2014-082827, filed Apr. 14, 2014, the disclosure of which are incorporated by reference in their entirety into this application.

BACKGROUND OF THE INVENTION (Field of the Invention)

The present invention relates to a structure of a toroidal continuously variable transmission.

(Description of Related Art)

As an electric power generating device for an aircraft, it is known to use a constant frequency generator (IDG) that operates while keeping a rotation rate (frequency) of a generator constant even when a rotation rate of an aircraft engine, which is a drive source, varies. As a transmission for keeping a rotation rate of the generator constant in the IDG, a toroidal continuously variable transmission has been proposed. The toroidal continuously variable transmission includes a toroidal transmission unit that includes: an input disc and an output disc concentrically arranged so as to be opposed to each other; and a power roller that is brought into contact with opposed curved concave surfaces of both discs at high pressure. By adjusting a tilt angle of the power roller relative to both discs, it is possible to steplessly (continuously) vary a gear ratio (see, e.g., Patent Documents 1 and 2).

In general, the discs of the toroidal continuously variable transmission are rotated at a high speed. Thus, when the discs are unbalanced even slightly, there is a possibility that large whirling occurs, so that it is necessary to correct the unbalance of the discs. As a technique to correct the unbalance of the discs of the toroidal continuously variable transmission, use of the outer peripheral surface, at the radially outer side, of each disc as an unbalance correction surface, for example, by performing processing such as perforating the outer peripheral surface, or by fixing a balancing ring to the outer peripheral surface, has been proposed (see Patent Document 3).

RELATED DOCUMENT

[Patent Document]

[Patent Document 1] JP Laid-open Patent Publication No. 2002-081519

[Patent Document 2] JP Laid-open Patent Publication No. H09-177918

[Patent Document 3] JP Laid-open Patent Publication No. 2007-113593

SUMMARY OF THE INVENTION

However, since high stress is applied to the entireties of the discs of the continuously variable transmission, when the discs are subjected to processing such as perforating even at the outer peripheral surfaces thereof, there is a possibility that the strength of the discs greatly decreases. In addition, in the case where an additional member for balance adjustment such as a balancing ring is provided on the outer peripheral surface of each disc, the dimension and the weight of the entire continuously variable transmission are increased.

Therefore, in order to solve the above-described problems, an object of the present invention is to provide a toroidal continuously variable transmission that can correct unbalance of a disc without impairing the strength of the disc, while suppressing an increase in the size of the continuously variable transmission.

In order to achieve the above-described object, a toroidal continuously variable transmission according to the present invention includes: at least one transmission unit including an input disc and an output disc disposed coaxially with each other; and a power roller tiltably interposed between the input disc and the output disc and configured to transmit a driving force from the input disc to the output disc; an integrally rotating member disposed so as to be spaced apart in an axial direction from at least one disc of the input disc and the output disc in each transmission unit and configured to rotate together with the at least one disc; and an annular interposed member interposed between the at least one disc and the integrally rotating member and configured to rotate together with the at least one disc, in which the interposed member is formed with a balance adjustment portion capable of adjusting weight balance in a circumferential direction.

According to this configuration, it is made possible to perform balance adjustment for the disc by using the interposed member which is a member separate from the disc and provided for the purpose other than disc balance adjustment. As a result, it is made possible to correct the unbalance of the disc, without impairing the strength of the disc, while suppressing an increase in the size of the continuously variable transmission.

In one embodiment of the present invention, the interposed member may be connected to the integrally rotating member so as to be non-rotatable relative to the integrally rotating member so that the interposed member is configured to rotate together with the at least one disc. According to this configuration, the interposed member having the balance adjustment portion can be provided so as to rotate together with the disc, without impairing the strength of the input disc by subjecting the disc itself to processing such as forming a cutout or a hole for connection.

In one embodiment of the present invention, the balance adjustment portion of the interposed member may be formed as a plurality of radial projections arranged at equal intervals in the circumferential direction. According to this configuration, balance adjustment can be performed by cutting, in a required amount, the radial projection in a direction in which balance adjustment is required. Therefore, it is made possible to assuredly and efficiently perform a balance adjustment work operation by using the interposed member having a simple structure.

The toroidal continuously variable transmission according to one embodiment of the present invention may include: a first transmission unit including a first input disc and a first output disc that are respectively the input disc and the output disc disposed coaxially with each other and a first power roller that is the power roller tiltably interposed between the first input disc and the first output disc and configured to transmit a driving force from the first input disc to the first output disc; and a second transmission unit disposed coaxially with the first transmission unit. The second transmission unit includes a second input disc and a second output disc that are respectively the input disc and the output disc disposed coaxially with each other and a second power roller that is the power roller tiltably interposed between the second input disc and the second output disc and configured to transmit a driving force from the second input disc to the second output disc, the second transmission unit being disposed such that a back surface of the second input disc is opposed to a back surface of the first input disc. An input gear configured to input power to the toroidal continuously variable transmission may be provided as the integrally rotating member between the first input disc and the second input disc, and annular support spacers may be provided as the interposed members between the first input disc and the input gear and between the second input disc and the input gear, respectively.

The first transmission unit and the second transmission unit may be disposed such that a back surface of the first output disc and a back surface of the second output disc are opposed to each other. In this case, an output gear configured to output power from the toroidal continuously variable transmission may be provided as the integrally rotating member between the first output disc and the second output disc, and annular support spacers may be provided as the interposed members between the first output disc and the output gear and between the second output disc and the output gear, respectively.

The toroidal continuously variable transmission according to one embodiment of the present invention may include: a first transmission unit including a first input disc and a first output disc that are respectively the input disc and the output disc disposed coaxially with each other and a first power roller that is the power roller tiltably interposed between the first input disc and the first output disc and configured to transmit a driving force from the first input disc to the first output disc; a second transmission unit disposed coaxially with the first transmission unit. The second transmission unit includes a second input disc and a second output disc that are respectively the input disc and the output disc disposed coaxially with each other and a second power roller that is the power roller tiltably interposed between the second input disc and the second output disc and configured to transmit a driving force from the second input disc to the second output disc, the second transmission unit being disposed such that a back surface of the second input disc is opposed to a back surface of the first input disc; and a bearing configured to rotatably support an input shaft to which power to the toroidal continuously variable transmission is inputted. A rotating member of the bearing may be disposed as the integrally rotating member at each of a back surface side of the first input disc and a back surface side of the second input disc, and annular shim plates may be provided as the interposed members between the first input disc and the rotating member and between the second input disc and the rotating member, respectively.

The first transmission unit and the second transmission unit may be disposed such that a back surface of the first output disc and a back surface of the second output disc are opposed to each other. In this case, a rotating member of a bearing supporting an output shaft may be disposed as the integrally rotating member at each of a back surface side of the first output disc and a back surface side of the second output disc, and annular shim plates may be provided as the interposed members between the first output disc and the rotating member and between the second output disc and the rotating member, respectively.

As described above, the present invention is also applicable to a so-called double-cavity-type toroidal continuously variable transmission.

In one embodiment of the present invention, in the case where the first transmission unit and the second transmission unit are included and disposed such that the back surface of the first input disc and the back surface of the second input disc are opposed to each other, a first output disc fixing member and a second output fixing member configured to fix the first output disc and the second output disc in the axial direction may be provided as the integrally rotating members at the back surface side of the first output disc and the back surface side of the second output disc, respectively, and annular washers may be provided as the interposed members between the first output disc and the first output disc fixing member and between the second output disc and the second output disc fixing member, respectively.

In addition, in one embodiment of the present invention, in the case where the first transmission unit and the second transmission unit are included and disposed such that the back surface of the first output disc and the back surface of the second output disc are opposed to each other, a first input disc fixing member and a second input fixing member configured to fix the first input disc and the second input disc in the axial direction may be provided as the integrally rotating members at the back surface side of the first input disc and the back surface side of the second input disc, respectively, and annular washers may be provided as the interposed members between the first input disc and the first input disc fixing member and between the second input disc and the second input disc fixing member, respectively.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
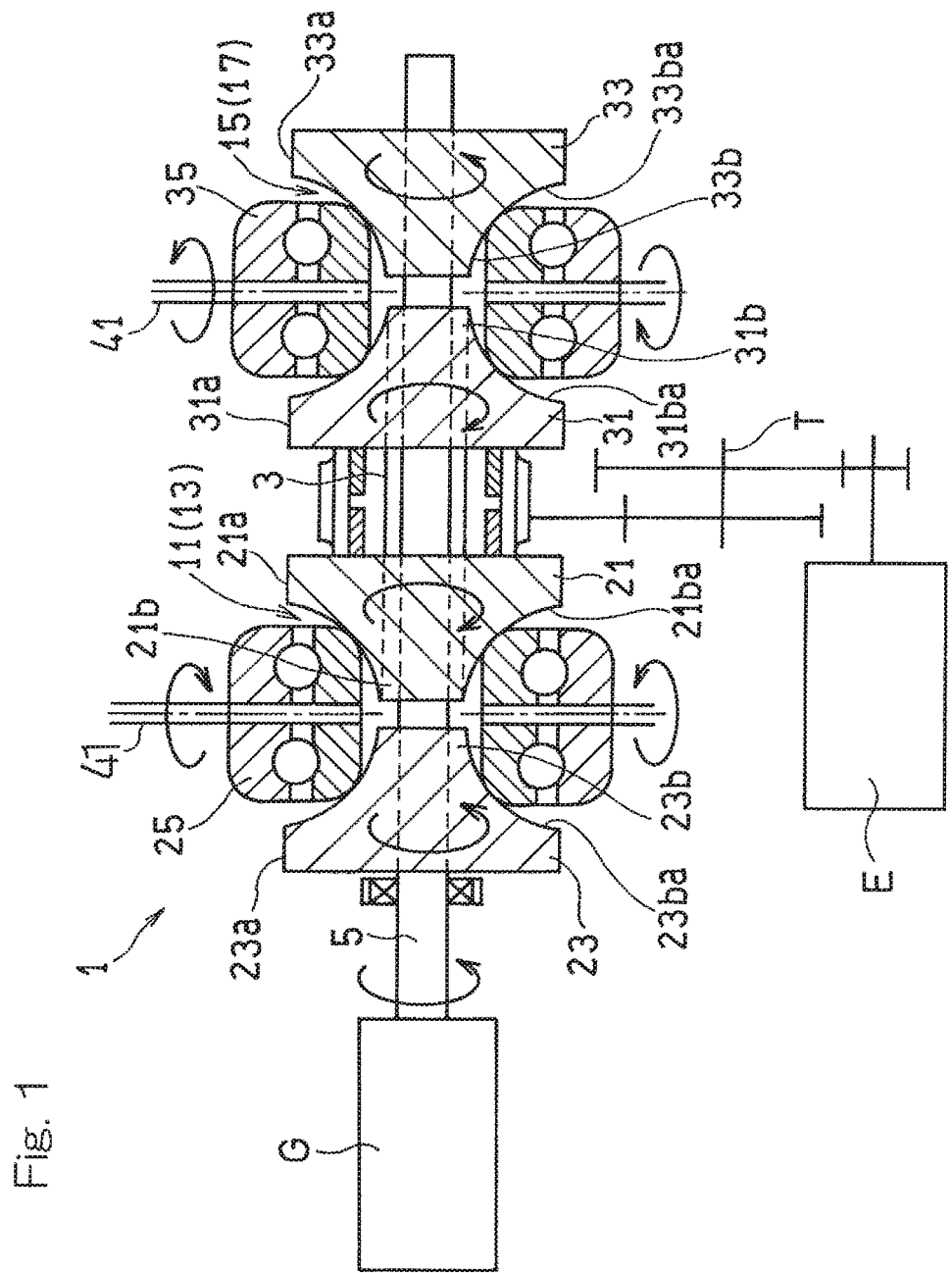
FIG. 1 is a longitudinal cross-sectional view schematically showing a schematic configuration of a toroidal continuously variable transmission according to a first embodiment of the present invention.

Hereinafter, embodiments of the present invention will be described with reference to the drawings. FIG. 1 is a longitudinal cross-sectional view schematically showing a toroidal continuously variable transmission (hereinafter, referred to simply as a "continuously variable transmission") 1 according to a first embodiment of the present invention. The continuously variable transmission 1 is provided between an aircraft engine E that is a drive source and a generator G that is a load device driven by the engine E. The continuously variable transmission 1 transmits a driving force of the engine E to the generator G while keeping a rotation rate of the generator G constant. A constant frequency generator mainly includes the continuously variable transmission 1 and the generator G. In the present embodiment, a "radial direction" that is not particularly specified refers to a radial direction based on the axis of an input shaft 3 or output shaft 5, which will be described later.

The engine E is connected to the input shaft 3 of the continuously variable transmission 1 via a power transmission mechanism T. The input shaft 3 is formed so as to be hollow. Power inputted to the input shaft 3 is outputted via the continuously variable transmission 1 from the output shaft 5 that is concentrically disposed at a hollow portion of the input shaft 3, to the generator G.

As shown in FIG. 1, the continuously variable transmission 1 is designed as a double-cavity-type toroidal continuously variable transmission. Specifically, the continuously variable transmission 1 includes: a first toroidal transmission unit 13 that forms a first cavity 11; and a second toroidal transmission unit 17 that forms a second cavity 15. The first toroidal transmission unit 13 and the second toroidal transmission unit 17 are disposed on the common output shaft 5 so as to be spaced apart from each other at a predetermined interval.

The first toroidal transmission unit 13 includes a first input disc 21, which is rotatably supported on the input shaft 3, a first output disc 23, which rotates together with the output shaft 5, and a plurality of (for example, two) first power rollers 25, which are interposed between the first input disc 21 and the first output disc 23. Similarly, the second toroidal transmission unit 17 includes a second input disc 31, which rotates together with the input shaft 3, a second output disc 33, which rotates together with the output shaft 5, and a plurality of (e.g., two) second power rollers 35, which are interposed between the second input disc 31 and the second output disc 33.

The respective discs 21, 23, 31, and 33 include disc-shaped base portions 21a, 23a, 31a, and 33a and projection portions 21b, 23b, 31b, and 33b that project from the base portions 21a, 23a, 31a, and 33a in an axial direction such that diameters thereof are gradually reduced. Side surfaces of the projection portions 21b, 23b, 31b, and 33b are formed as curved concave surfaces 21ba, 23ba, 31ba, and 33ba, respectively. The first input disc 21 and the first output disc 23 are disposed such that the projection portions 21b and 23b thereof are opposed to each other. Similarly, the second input disc and the second output disc are disposed such that the projection portions 31b and 33b thereof are opposed to each other.

Each of the power rollers 25 and 35 is supported by a thrust bearing and a trunnion, which is a known support member, so as to be rotatable about a roller shaft 41 and be tiltable about a tilt shaft located at a position skewed relative to the input shaft 3. The power rollers 25 and 35 supported thus are pressed against the concave surfaces 21ba and 31ba of the input discs 21, 31 and the concave surfaces 23ba and 33ba of the output disc 23, respectively, at high pressure by power of a pressing force adding mechanism (not shown) that generates a pressing force to the power rollers 25 and 35. Change of an acceleration ratio and a deceleration ratio of the continuously variable transmission 1, that is, change of a gear ratio thereof is performed by controlling tilt rotation angles that are tilts of the power rollers 25 and 35.

Figure 2:
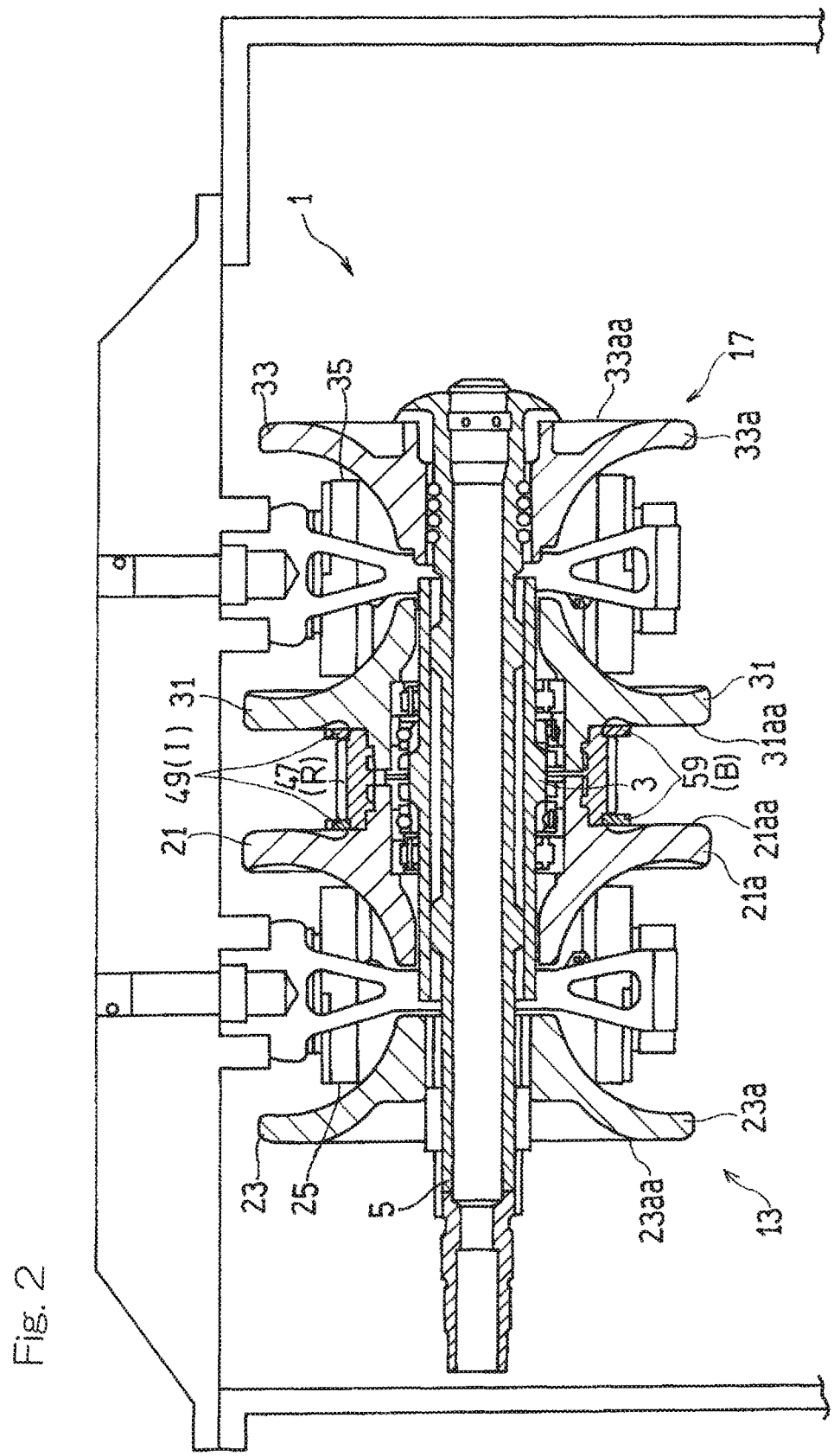
FIG. 2 is a longitudinal cross-sectional view showing a configuration example of the toroidal continuously variable transmission in FIG. 1.

As shown in FIG. 2, the first toroidal transmission unit 13 and the second toroidal transmission unit 17 are disposed such that back surfaces (bottom surfaces of the base portions 21a and 31a) 21aa and 31aa of the input discs 21,31 thereof or back surfaces (bottom surfaces of the base portions 23a and 33a) 23aa and 33aa of the output discs 23, 33 thereof are opposed to each other. The first toroidal transmission unit 13 and the second toroidal transmission unit 17 in the present embodiment are disposed such that the back surfaces 21aa and 31aa of the input discs 21, 31 thereof are opposed to each other.

The continuously variable transmission 1 according to the present embodiment includes: an integrally rotating member R that is disposed so as to be spaced apart in the axial direction from at least one disc of the input disc 21, 31 and the output disc 23, 33 in each transmission unit 13, 17 and rotates together with the at least one disc; and an interposed member I of an annular shape that is interposed between the at least one disc and the integrally rotating member R and rotates together with the at least one disc. The interposed member I is formed with a balance adjustment portion B capable of adjusting weight balance in a circumferential direction.

Figure 3:
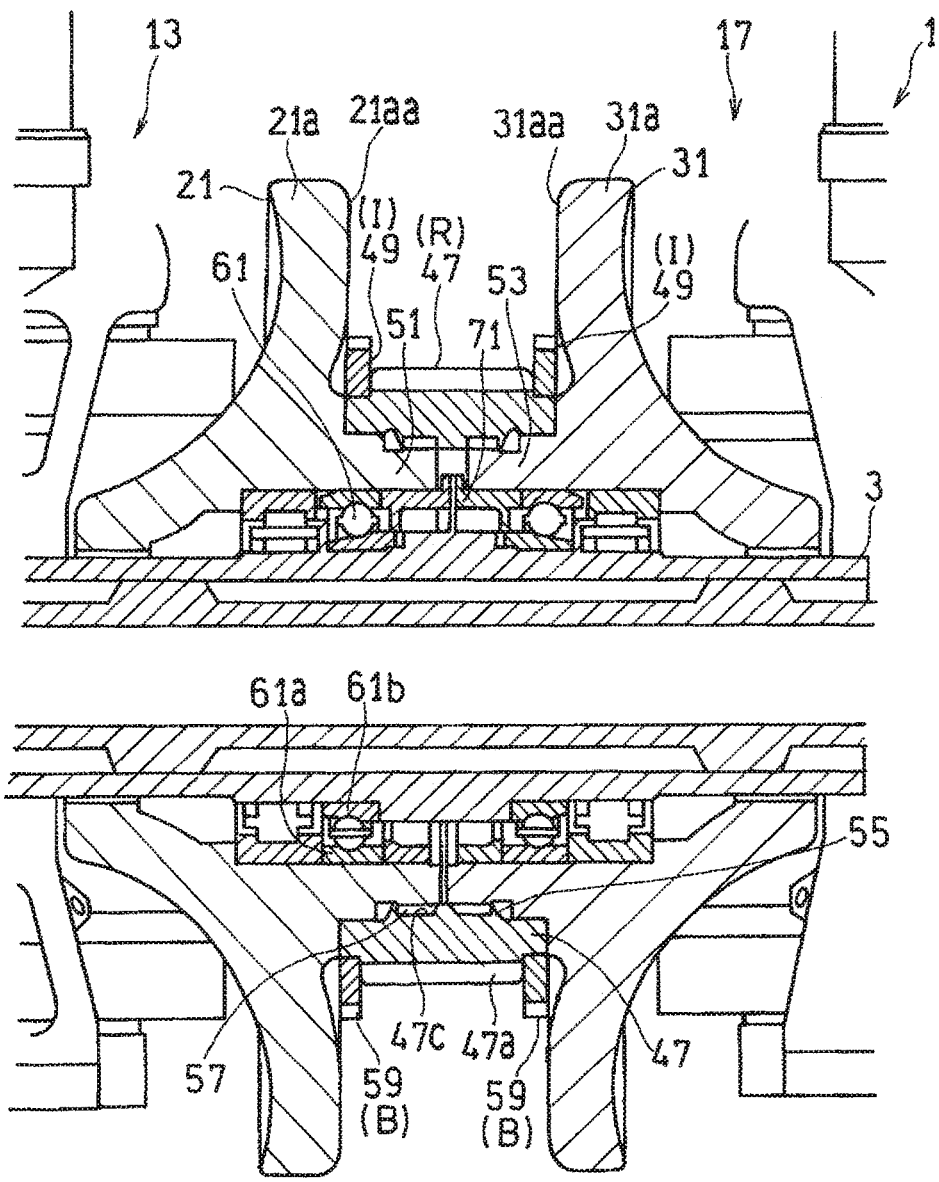
FIG. 3 is a longitudinal cross-sectional view showing an axially central portion of the toroidal continuously variable transmission in FIG. 2.

As shown in FIG. 3, in the present embodiment, an input gear 47 that inputs power to the continuously variable transmission 1 is provided as the integrally rotating member R between the first input disc 21 and the second input disc 31, and annular support spacers 49 are provided as the interposed members I between the first input disc 21 and the input gear 47 and between the second input disc 31 and the input gear 47, respectively. Hereinafter, the configuration of these members will be described in detail.

On the respective back surfaces 21aa and 31aa of the two discs (the first input disc 21 and the second input disc 31 in the illustrated example) disposed at the axially central portion of the continuously variable transmission 1 such that the back surfaces thereof are opposed to each other, tubular back surface cylinder walls 51 and 53 are respectively provided so as to project therefrom in the axial direction. The input gear 47 having an external tooth gear is connected over outer peripheral portions of both back surface cylinder walls 51 and 53 aligned in the axial direction. In other words, the input gear 47 is provided on the outer peripheral portions of both back surface cylinder walls 51 and 53 of the first input disc 21 and the second input disc 31 concentrically with these input discs 21, 31 so as to cover both back surface cylinder walls 51 and 53 from the radially outer side. Power from the engine E (FIG. 1) is inputted via the input gear 47 to the continuously variable transmission 1.

The first input disc 21, the second input disc 31, and the input gear 47 are connected to each other via a connection mechanism that connects the first input disc 21, the second input disc 31, and the input gear 47 such that the first input disc 21, the second input disc 31, and the input gear 47 are non-rotatable relative to each other. Specifically, in the illustrated example, a spline (gear-side spline) 55 is formed as the connection mechanism on the inner peripheral surface of a cylindrical base portion 47b supporting external teeth 47a of the input gear 47 (i.e., the inner peripheral surface of the input gear 47) and over the entire circumference thereof. On the other hand, a spline (disc-side spline) 57 is formed as the connection mechanism also on each of outer peripheral surfaces 51b and 53b of both back surface cylinder walls 51 and 53 of the first input disc 21 and the second input disc 31 and over the entire circumference thereof. By fitting the disc-side splines 57 to the gear-side spline 55, the input gear 47, the first input disc 21, and the second input disc 31 are connected to each other so as to be non-rotatable relative to each other. The mode in which both input discs 21, 31 and the input gear 47 are connected to each other so as to be non-rotatable relative to each other is not limited to the above example, and, for example, a connection mechanism such as a key and curvic coupling may be used, or both input discs 21, 31 and the input gear 47 may be connected to each other by press-fitting the input discs 21, 31 and the input gear 47 to such a degree that the input discs 21, 31 and the input gear 47 are non-rotatable relative to each other.

Figure 4:
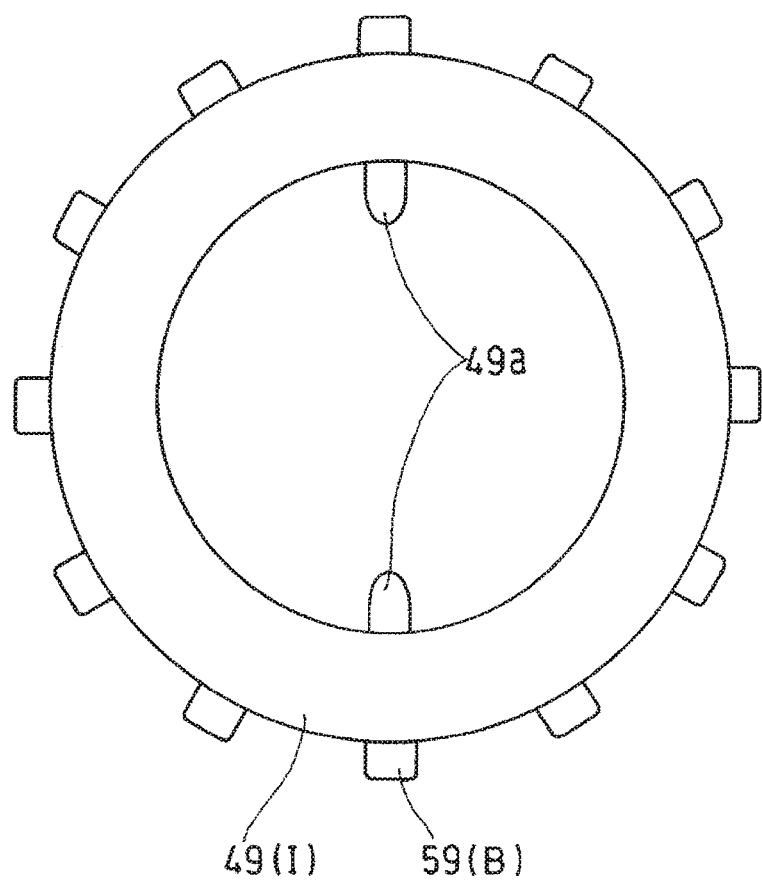
FIG. 4 is a side view schematically showing a support spacer used in the toroidal continuously variable transmission in FIG. 1.
Figure 5:
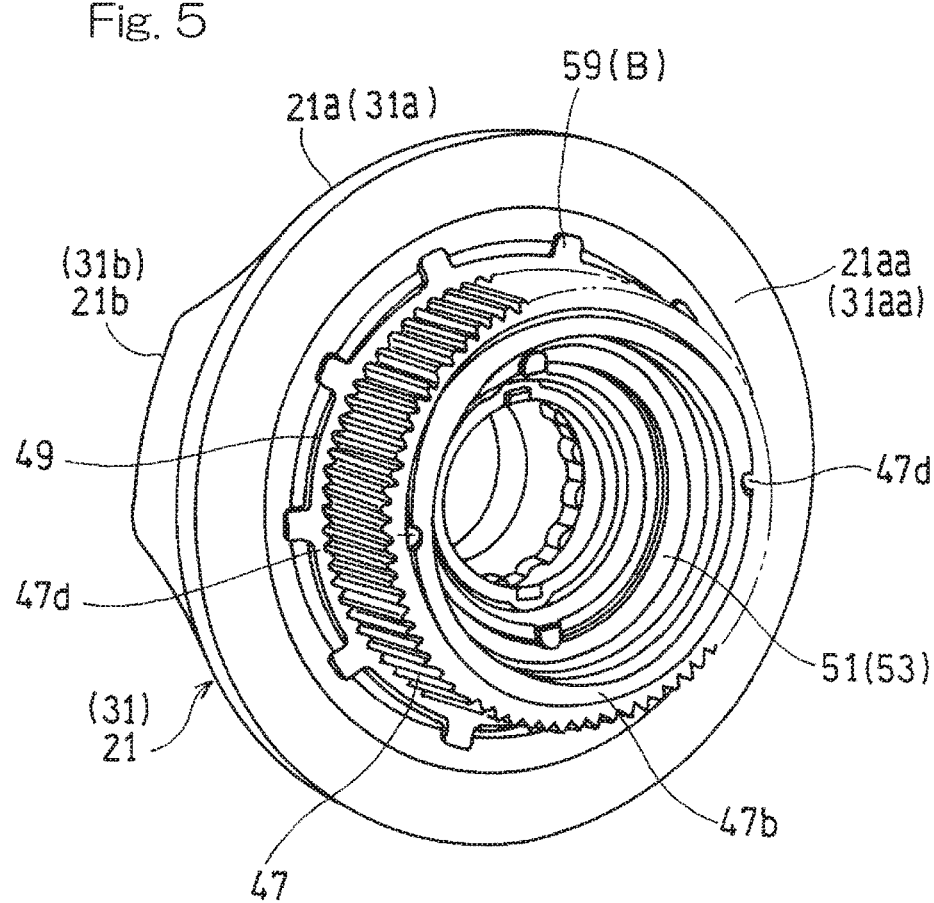
FIG. 5 is a perspective view showing a configuration example of a back surface side of an input disc used in the toroidal continuously variable transmission in FIG. 1.

In addition, each support spacer 49, which is the interposed member I, and the input gear 47, which is the integrally rotating member R, are connected to each other via a connection mechanism that connects each support spacer 49 and the input gear 47 such that each support spacer 49 and the input gear 47 are non-rotatable relative to each other. Specifically, as schematically shown in FIG. 4, one or a plurality of (two in the illustrated example) positioning projections 49a are provided on the inner peripheral surface of each support spacer 49 so as to project radially inward. On the other hand, as shown in FIG. 5, positioning recess portions 47d that are brought into engagement with the respective positioning projections 49a of the support spacer 49 are provided on the outer peripheral surface of the base portion 47b of the input gear 47 with an arrangement and a number thereof corresponding to those of the positioning projections 49a.

In the present embodiment, each support spacer 49, which is the interposed member I, is formed as a member separate from the input gear 47, and is connected to the base portion 47b of the input gear 47 as described above. Accordingly, it is made possible to assuredly and efficiently perform a balance adjustment work by using the interposed members I having a simple structure, without affecting the input gear 47 and both input discs 21, 31.

As described above, in the present embodiment, the input gear 47 is directly connected to the back surface cylinder walls 51 and 53, which are provided on the back surfaces of the input discs 21, 31 so as to project therefrom, such that the input gear 47 is non-rotatable relative to the back surface cylinder walls 51 and 53; and the support spacers 49 is connected to the input gear 47 such that the support spacers 49 are non-rotatable relative to the input gear 47, so that the support spacers 49 are configured to rotate together with the input discs 21, 31. Therefore, the support spacers 49 each having the balance adjustment portion B can be provided so as to rotate together with the input discs 21, 31, without impairing the strength of the input discs 21, 31 by subjecting main bodies (the base portions 21a and 31a and the projection portions 21b and 31b) of the input discs 21, 31 to processing such as forming cutouts or holes for connection.

As shown in FIG. 3, the axial length of the cylindrical base portion 47b of the input gear 47 is set so as to be longer than the axial length of each external tooth 47a. One axial end of the base portion 47b is in contact with a portion, at the outer diameter side of the back surface cylinder wall 51, of the back surface 21aa of the first input disc 21, and the other axial end of the base portion 47b is in contact with a portion, at the outer diameter side of the back surface cylinder wall 53, of the back surface 31aa of the second input disc 31. That is, the first input disc 21 and the second input disc 31 are supported in the axial direction at the back surface side thereof by the input gear 47, whereby the first input disc 21 and the second input disc 31 are prevented from falling down in an axially central direction. In addition, since the input gear 47 is provided so as to cover both back surface cylinder walls 51 and 53 from the radially outer side, it is possible to suppress deformation of the back surface cylinder walls 51 and 53 due to loads received by the back surface cylinder walls 51 and 53, by adjusting the rigidity of the input gear 47 as needed.

Furthermore, the annular support spacers 49 are interposed between one axial end of each external tooth 47a of the input gear 47 and the back surface 21aa of the first input disc 21, and between the other axial end of each external tooth 47a of the input gear 47 and the back surface 31aa of the second input disc 31, respectively. The first input disc 21 and the second input disc 31 are supported in the axial direction at the back surface side thereof further by the input gear 47 via the support spacers 49. By interposing the support spacers 49 between both ends of each external tooth 47a of the input gear 47 located at the outer side with respect to the base portion 47b and the back surfaces 21aa and 31aa of both input discs, both input discs 21, 31 can be stably supported in the axial direction with a support position on each disc back surface being shifted further to the outer diameter side, without increasing the outer diametric dimension of the input gear 47. Thus, as in the illustrated example, each of the outer diametric dimensions of the surfaces of the support spacers 49 that are in contact with the disc back surfaces 21aa and 31aa may be set so as to be larger than the outer diametric dimension of each external tooth 47a of the input gear 47.

The external teeth 47a of the input gear 47 may have a small diameter from the standpoint that resistance of oil agitation by the input gear 47 is reduced and the radial dimension of the continuously variable transmission 1 is reduced. Specifically, the outer peripheral end of each external tooth 47a of the input gear 47 may be located radially inward of the outer peripheral ends of the input discs 21, 31. In addition, the radial position at which the base portion 47b of the input gear 47 is provided is preferably close to the outer peripheral ends of the input discs 21, 31 in order to effectively suppress axial deformation of the input discs 21, 31, that is, falling down due to loads received from the power rollers 25 and 35. Specifically, the radial position of the inner peripheral surface of the base portion 47b of the input gear 47 may be radially outward of the radial position of each of contact points between the input discs 21, 31 and the power rollers 25 and 35 in a state where the tilt rotation angles of the power rollers 25 and 35 are zero (deceleration ratio=1).

As shown in FIG. 4, each support spacer 49 is provided with a plurality of (12 in the illustrated example) radial projections 59 arranged on the outer peripheral portion of the support spacer 49 at equal intervals in the circumferential direction. These radial projections 59 function as the balance adjustment portion B for adjusting the weight balance in the circumferential direction. Specifically, of these radial projections 59, a radial projection 59 at a circumferential position that corresponds to a direction in which unbalance correction for the input disc 21(31) (FIG. 3) is required is cut in a required weight amount. Accordingly, the weight balance in the circumferential direction of the input discs 21, 31, which rotate together with the support spacers 49 while being in contact with the support spacers 49, is adjusted. Therefore, it is made possible to assuredly and efficiently perform a balance adjustment work operation by using the interposed members I having a simple structure. In the case where the balance adjustment portion B is provided as the plurality of radial projections 59 on each interposed member I (support spacer 49), the number of the radial projections 59 is not limited to the illustrated example, and may be set as appropriate from the standpoint that balance adjustment in the circumferential direction is made easy and production of the interposed members I is made easy. In addition, from the standpoint of preventing the input disc 21(31) from falling down, each of the outer diametric dimensions of the plurality of radial projections 59, which are the balance adjustment portion B, may be set so as to be larger than the outer diametric dimension of each external tooth 47a of the input gear 47. In addition, the form of the balance adjustment portion B provided on each interposed member I is not limited to the illustrated example, as long as it is possible to adjust the weight balance in the circumferential direction. For example, the entirety of a circumference-shaped outer peripheral portion of the interposed member I may be set as the balance adjustment portion B, and a portion of the outer peripheral portion in a direction in which unbalance correction for the input disc 21(31) is required may be cut toward the inner diameter side in a required weight amount.

As shown in FIG. 3, the first input disc 21, the second input disc 31, and the input gear 47 are rotatably supported on the tubular input shaft 3 via respective bearings described below. The input shaft 3 is rotatably mounted on the outer periphery of the output shaft 5, which is a main shaft, via a bearing (not shown). The bearings that rotatably support the first input disc 21, the second input disc 31, and the input gear 47 on the input shaft 3 are selected and disposed so as to be able to bear both a load in the radial direction and a load in the axial direction.

Bearings 61 are provided for the respective back surface cylinder walls 51 and 53. The bearings 61 are disposed at axial positions at the inner peripheral sides of the back surface cylinder walls 51 and 53. Here, the back surface cylinder walls 51 and 53 function as bearing supports that support the bearings 61. In addition, the bearings 61 support the input gear 47 on the input shaft 3 via the back surface cylinder walls 51 and 53. The bearings 61 receive loads both in the radial direction and in the axial direction from the input gear 47 and both input discs 21, 31 via the back surface cylinder walls 51 and 53. Thus, the bearings 61 may be bearings of a type capable of bearing loads both in the radial direction and in the axial direction, for example, ball bearings.

The number of the bearings for each of the back surface cylinder walls 51 and 53 is not limited to one. As shown in FIG. 3, a plurality of bearings may be used in combination for each of the back surface cylinder walls 51 and 53. In this case, a combination of the plurality of bearings capable of bearing loads both in the radial direction and in the axial direction may be employed. Other than the illustrated example, one bearing may be supported by both of the back surface cylinder walls 51 and 53.

In the case where the bearings 61 are disposed at the inner diameter sides of the back surface cylinder walls 51 and 53 as described above, an outer ring 61a of each bearing 61 that is a rotating member for the input shaft 3 is provided so as to be non-rotatable relative to the input disc 21(31) and the input gear 47. In addition, an inner ring 61b of each bearing 61 that is a stationary member is provided so as to be non-rotatable relative to the input shaft 3.

Figure 6:
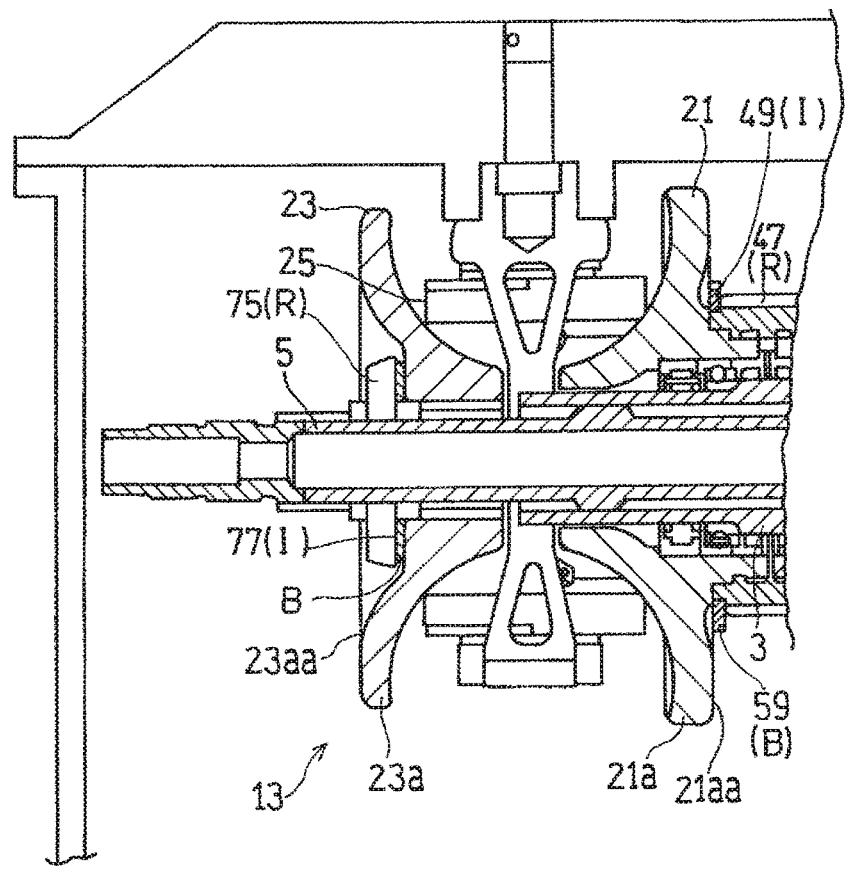
FIG. 6 is a longitudinal cross-sectional view showing a modification of the toroidal continuously variable transmission in FIG. 2.

As a modification of the present embodiment, as shown in FIG. 6, further, output disc fixing members 75 that fix the first output disc 23 and the second output disc 33 in the axial direction may be provided as the integrally rotating member R at the back surface side of the first output disc 23 and the back surface side of the second output disc 33 (only the first output disc 23 side is shown in FIG. 6), annular washers 77 may be provided as the interposed members I between the first output disc 23 and the first output disc fixing member 75 and between the second output disc 33 and the second output disc fixing member 75, respectively, and the balance adjustment portion B may be formed on each of outer peripheral portions of the washers 77.

In the illustrated example, at the back surface side of the first output disc 23, a fixing nut is provided as the first output disc fixing member 75 so as to be screwed onto an end portion of the output shaft 5.

In the present embodiment, the example has been shown in which the interposed members I having the balance adjustment portions B are provided at each of both sides of the input discs 21, 31 and the output discs 23, 33. However, the interposed members I having the balance adjustment portions B may be provided at only either one of the input discs 21, 31 and the output discs 23, 33. In the case where the interposed members I having the balance adjustment portions B are provided at only either one of the input discs 21, 31 and the output discs 23, 33, the interposed members I having the balance adjustment portions B may be provided at the discs that rotates at a higher speed (the input discs 21, 31 in the present embodiment) among input discs 21, 31 and the output discs 23, 33, from the standpoint of whirling suppression.

With the toroidal continuously variable transmission 1 according to the present embodiment, balance adjustment for the discs can be performed by using the interposed members I, which are members separate from the input discs 21, 31 and the output discs 23, 33. As a result, it is made possible to correct unbalance of the discs, without impairing the strength of the discs, while suppressing an increase in the size of the continuously variable transmission 1.

Figure 7:
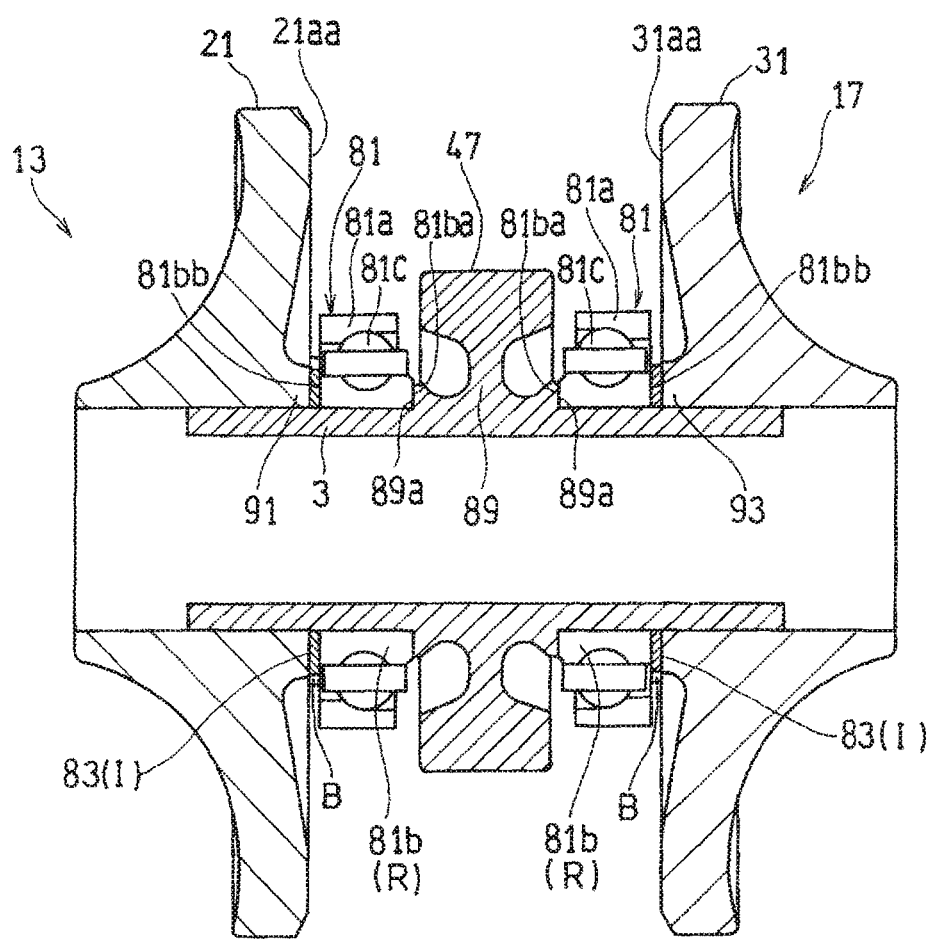
FIG. 7 is a longitudinal cross-sectional view showing a toroidal continuously variable transmission according to a second embodiment of the present invention.

Next, an example in which members different from those in the above first embodiment are used as the "integrally rotating members R" and the "interposed members I" in the present invention will be described as a second embodiment. FIG. 7 shows a toroidal continuously variable transmission 1 according to the second embodiment of the present invention. The continuously variable transmission 1 according to the present embodiment is a double-cavity-type toroidal continuously variable transmission including a first toroidal transmission unit 13 and a second toroidal transmission unit 17 similarly as in the first embodiment. The first toroidal transmission unit 13 and the second toroidal transmission unit 17 are disposed such that the back surfaces 21aa and 31aa of the input discs 21, 31 thereof are opposed to each other. Furthermore, the continuously variable transmission 1 according to the present embodiment includes: integrally rotating members R each of which is disposed at a position spaced apart in the axial direction from at least one disc of the input disc and the output disc and rotates together with the at least one disc; and annular interposed members I each of which is interposed between the at least one disc and the integrally rotating member R and rotates together with the at least one disc. The interposed member I has the same configuration as in the first embodiment in that a balance adjustment portion B capable of adjusting weight balance in the circumferential direction is formed. Hereinafter, regarding the continuously variable transmission 1, the differences from the first embodiment will be mainly described in detail.

The continuously variable transmission 1 according to the present embodiment includes bearings (input shaft support bearings 81) that rotatably support an input shaft 3 to which power to the continuously variable transmission 1 is inputted. The type of a bearing used as each input shaft support bearing 81 is not particularly limited, and may be a bearing of a type capable of bearing a load in the axial direction. In the illustrated example, as each input shaft support bearing 81, a ball bearing, which includes: an outer ring 81a that is a stationary member; an inner ring 81b that is a rotating member; and a plurality of balls 81c interposed between the outer ring 81a and the inner ring 81b, is used. The inner ring 81b, which is the rotating member of the bearing, is disposed as the integrally rotating member R at the back surface side of the first input disc 21, annular shim plates 83 are provided as the interposed members I between the first input disc 21 and the inner ring 81b and between the second input disc 31 and the inner ring 81b, respectively. An input gear 47 is integrally provided at an axially central portion of the input shaft 3. In the description of the present embodiment, the axially central portion side of the input shaft 3 is referred to merely as "axially central side", and both axial end sides of the input shaft 3 are referred to as "axially outer side".

The input shaft 3 has opposite end portions each having outer peripheral surface formed with a shaft-side splines 85. On the other hand, disc-side splines 87 are formed on the inner peripheral surface of the first input disc 21 and the inner peripheral surface of the second input disc 31, respectively. The first input disc 21, the second input disc 31, and the input shaft 3 are connected to each other via the input shaft-side splines 85 and the disc-side splines 87 so as to be non-rotatable relative to each other. The mode in which both input discs 21, 31 and the input shaft 3 are connected to each other so as to be non-rotatable relative to each other is not limited to the above example, and, for example, a connection mechanism such as a key and curvic coupling may be used, or both input discs 21, 31 and the input shaft 3 may be connected to each other by press-fitting both input discs 21, 31 and the input shaft 3 to such a degree that the input discs 21, 31 and the input shaft 3 are non-rotatable relative to each other.

The input shaft support bearings 81 are disposed on the outer peripheral surface of the input shaft 3, and between the first input disc 21 and the input gear 47 and between the second input disc 31 and the input gear 47, respectively, so as to be spaced apart in the axial direction from the first input disc 21 and the second input disc 31. The inner ring 81b of each input shaft support bearing 81 has an end surface 81ba which faces toward the axially central side and is in contact with a side surface 89a (a surface facing toward the axially outer side) of a base portion 89 of the input gear 47. The annular shim plate 83 is interposed between an end surface 81bb, at the axially outer side, of the inner ring 81b of each input shaft support bearing 81 and each of an inner peripheral portion 91 of the back surface 21aa of the first input disc 21 and an inner peripheral portion 93 of the back surface 31aa of the second input disc 31. By interposing the shim plate 83 between each of the input discs 21, 31 and each of the inner rings 81b, 81b of the bearings 81, 81, fretting between each of the input discs 21, 31 and each of the inner rings 81b, 81b of the bearings 81, 81 is prevented. From the standpoint of preventing falling-down of the first input disc 21, the outer diameter of the shim plate 83 may be set so as to be substantially equal to or larger than the outer diameter of the end surface of the inner peripheral portion 91 of the first input disc 21. The same applies to the second input disc 31 side.

In the present embodiment, each shim plate 83 is formed with the balance adjustment portion B. The form of the balance adjustment portion B formed at each shim plate 83 may be a plurality of radial projections arranged at equal intervals in the circumferential direction similarly to those shown in the first embodiment. Alternatively, the entirety of a circumference-shaped outer peripheral portion of the shim plate 83 may be utilized as the balance adjustment portion B, or other appropriate form may be employed as the balance adjustment portion B.

In the present embodiment as well, each shim plate 83 may be connected to the inner ring 81b, which is the integrally rotating member R, such that the shim plate 83 is non-rotatable relative to the inner ring 81b, so that the respective shim plates 83, 83 may rotate together with the first input disc 21 and the second input disc 31.

In the present embodiment as well, similarly as in the case of the first embodiment, the interposed members I having the balance adjustment portions B may be provided at each of both sides of the input discs 21 ad 31 and the output discs 23, 33, or may be provided at only either one of both sides of the input discs 21 ad 31 and the output discs 23, 33. In the case where the interposed members I having the balance adjustment portions B are provided at only either one of both sides of the input discs 21 ad 31 and the output discs 23, 33, the interposed members I having the balance adjustment portions B are preferably provided at the discs that rotate at a higher speed (the input discs 21, 31 in the present embodiment) among the input discs 21 ad 31 and the output discs 23, 33, from the standpoint of whirling suppression.

In each of the above-described embodiments, the example has been shown in which the respective input discs 21, 31 of the first toroidal transmission unit 13 and the second toroidal transmission unit 17 are disposed at the axially central portion of the entire continuously variable transmission 1 such that the back surfaces 21aa and 31aa thereof are opposed to each other. However, the respective output discs 23, 33 may be disposed at the axially central portion of the entire continuously variable transmission 1 such that the back surfaces 23aa and 33aa thereof are opposed to each other. In this case, an output gear is disposed between the back surfaces 23aa and 33aa of the output discs 23, 33. In the case with such a configuration as well, the members at the power input and output sides are only interchanged with each other, and the integrally rotating members R and the interposed members I having the balance adjustment portions B can be provided similarly as in the above-described embodiments.

In addition, in the description of each of the above-described embodiments, the double-cavity-type toroidal continuously variable transmission has been described as an example. However, the present invention is also applicable to a single-cavity-type toroidal continuously variable transmission having a single transmission unit. The single-cavity-type toroidal continuously variable transmission also includes: an integrally rotating member R that is disposed at a position spaced apart in the axial direction from at least one disc of an input disc and an output disc and rotates together with the at least one disc; and an annular interposed member I that is interposed between the at least one disc and the integrally rotating member R and rotates together with the at least one disc. The interposed member I is formed with a balance adjustment portion B capable of adjusting weight balance in the circumferential direction.

In the case where the present invention is applied to a single-cavity-type toroidal continuously variable transmission, for example, similarly to the first transmission unit 13 in the modification of the first embodiment described with reference to FIG. 6, an output disc fixing member 75 that fixes the output disc 23 in the axial direction may be provided as the integrally rotating member R at the back surface side of the output disc 23, an annular washer 77 may be provided as the interposed member I between the output disc 23 and the output disc fixing member 75, and the balance adjustment portion B may be provided on an outer peripheral portion of the washer 77. However, also in the single-cavity-type toroidal continuously variable transmission, the integrally rotating member R and the interposed member I are not limited to this example, and, for example, an input gear, a support spacer, a bearing inner ring, and a shim plate that are disposed at the back surface side of the input disc may be used as the integrally rotating member R and the interposed member I.

The "integrally rotating member R" in the present invention is not limited to the input gear 47, the bearing inner ring 81*b*, and the output disc fixing member 75, which have been described in the respective above-described embodiments, as long as the "integrally rotating member R" is a member that is disposed so as to be spaced apart in the axial direction from the input disc or the output disc and integrally rotates with the input disc or the output disc. In addition, the functions of the "interposed member I" in the present invention other than the disc balance adjustment are not limited to the disc supporting (prevention of falling-down of the disc), the fretting prevention, and the washer for the output disc fixing member, which have been exemplified in the respective above-described embodiments.

In the description of each of the above-described embodiments, the toroidal continuously variable transmission used in the IDG for an aircraft has been described as an example. However, the use of the toroidal continuously variable transmission to which the present invention is applied is not limited to an aircraft, and may be, for example, for an automobile.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Continuously variable transmission
13 . . . First transmission unit
17 . . . Second transmission unit
21 . . . First input disc
23 . . . First output disc
25 . . . First power roller
31 . . . Second input disc
33 . . . Second output disc
35 . . . Second power roller
47 . . . Input gear
49 . . . Support spacer
75 . . . Output disc fixing member
77 . . . Washer
81 . . . Input shaft support bearing (bearing)
81*b* . . . Inner ring (rotating member of bearing)
83 . . . Shim plate
B . . . Balance adjustment portion
I . . . Interposed member
R . . . Integrally rotating member

What is claimed is:

1. A toroidal continuously variable transmission comprising:
at least one transmission unit including:
an input disc and an output disc disposed coaxially with each other; and
a power roller tiltably interposed between the input disc and the output disc and configured to transmit a driving force from the input disc to the output disc;
an integrally rotating member disposed so as to be spaced apart in an axial direction from at least one disc of the input disc and the output disc in each transmission unit and configured to rotate together with the at least one disc; and
an annular interposed member interposed between the at least one disc and the integrally rotating member and configured to rotate together with the at least one disc, wherein
the interposed member is formed with a balance adjustment portion capable of adjusting weight balance in a circumferential direction, and
the balance adjustment portion of the interposed member is formed as a plurality of radial projections arranged at equal intervals in the circumferential direction.

2. The toroidal continuously variable transmission as claimed in claim 1, wherein the interposed member is connected to the integrally rotating member so as to be non-rotatable relative to the integrally rotating member so that the interposed member is configured to rotate together with the at least one disc.

3. A toroidal continuously variable transmission comprising:
at least one transmission unit including:
an input disc and an output disc disposed coaxially with each other; and
a power roller tiltably interposed between the input disc and the output disc and configured to transmit a driving force from the input disc to the output disc;
an integrally rotating member disposed so as to be spaced apart in an axial direction from at least one disc of the input disc and the output disc in each transmission unit and configured to rotate together with the at least one disc; and
an annular interposed member interposed between the at least one disc and the integrally rotating member and configured to rotate together with the at least one disc, wherein
the interposed member is formed with a balance adjustment portion capable of adjusting weight balance in a circumferential direction, and
the at least one transmission unit includes:
a first transmission unit including:
a first input disc and a first output disc that are respectively the input disc and the output disc disposed coaxially with each other; and
a first power roller that is the power roller tiltably interposed between the first input disc and the first output disc and configured to transmit a driving force from the first input disc to the first output disc; and
a second transmission unit disposed coaxially with the first transmission unit, including:
a second input disc and a second output disc that are respectively the input disc and the output disc disposed coaxially with each other; and
a second power roller that is the power roller tiltably interposed between the second input disc and the second output disc and configured to transmit a driving force from the second input disc to the second output disc, the second transmission unit being disposed such that a back surface of the second input disc is opposed to a back surface of the first input disc, wherein an input gear configured to input power to the toroidal continuously variable transmission is provided as the integrally rotating member between the first input disc and the second input disc, and annular support spacers are provided as the interposed members between the first input disc and the input gear and between the second input disc and the input gear, respectively.

4. The toroidal continuously variable transmission as claimed in claim 3, wherein a first output disc fixing member and a second output fixing member configured to fix the first output disc and the second output disc in the axial direction are provided as the integrally rotating members at the back surface side of the first output disc and the back surface side of the second output disc, respectively, and annular washers are provided as the interposed members between the first output disc and the first output disc fixing member and between the second output disc and the second output disc fixing member, respectively.

5. A toroidal continuously variable transmission comprising:

at least one transmission unit including:

an input disc and an output disc disposed coaxially with each other; and a power roller tiltably interposed between the input disc and the output disc and configured to transmit a driving force from the input disc to the output disc;

an integrally rotating member disposed so as to be spaced apart in an axial direction from at least one disc of the input disc and the output disc in each transmission unit and configured to rotate together with the at least one disc; and an annular interposed member interposed between the at least one disc and the integrally rotating member and configured to rotate together with the at least one disc, wherein the interposed member is formed with a balance adjustment portion capable of adjusting weight balance in a circumferential direction, the at least one transmission unit includes:

a first transmission unit including:

a first input disc and a first output disc that are respectively the input disc and the output disc disposed coaxially with each other; and a first power roller that is the power roller tiltably interposed between the first input disc and the first output disc and configured to transmit a driving force from the first input disc to the first output disc;

a second transmission unit disposed coaxially with the first transmission unit, including:

a second input disc and a second output disc that are respectively the input disc and the output disc disposed coaxially with each other; and a second power roller that is the power roller tiltably interposed between the second input disc and the second output disc and configured to transmit a driving force from the second input disc to the second output disc, the second transmission unit being disposed such that a back surface of the second input disc is opposed to a back surface of the first input disc; and the toroidal continuously variable transmission further comprises a bearing configured to rotatably support an input shaft to which power to the toroidal continuously variable transmission is inputted, wherein a rotating member of the bearing is disposed as the integrally rotating member at each of a back surface side of the first input disc and a back surface side of the second input disc, and annular shim plates are provided as the interposed members between the first input disc and the rotating member and between the second input disc and the rotating member, respectively.

6. The toroidal continuously variable transmission as claimed in claim 5, wherein a first output disc fixing member and a second output fixing member configured to fix the first output disc and the second output disc in the axial direction are provided as the integrally rotating members at the back surface side of the first output disc and the back surface side of the second output disc, respectively, and annular washers are provided as the interposed members between the first output disc and the first output disc fixing member and between the second output disc and the second output disc fixing member, respectively.

7. A toroidal continuously variable transmission comprising:

at least one transmission unit including:

an input disc and an output disc disposed coaxially with each other; and a power roller tiltably interposed between the input disc and the output disc and configured to transmit a driving force from the input disc to the output disc;

an integrally rotating member disposed so as to be spaced apart in an axial direction from at least one disc of the input disc and the output disc in each transmission unit and configured to rotate together with the at least one disc; and an annular interposed member interposed between the at least one disc and the integrally rotating member and configured to rotate together with the at least one disc, wherein the interposed member is formed with a balance adjustment portion capable of adjusting weight balance in a circumferential direction, and the at least one transmission unit includes:

a first transmission unit including:

a first input disc and a first output disc that are respectively the input disc and the output disc disposed coaxially with each other; and a first power roller that is the power roller tiltably interposed between the first input disc and the first output disc and configured to transmit a driving force from the first input disc to the first output disc; and a second transmission unit disposed coaxially with the first transmission unit, including:

a second input disc and a second output disc that are respectively the input disc and the output disc disposed coaxially with each other; and a second power roller that is the power roller tiltably interposed between the second input disc and the second output disc and configured to transmit a driving force from the second input disc to the second output disc, the second transmission unit being disposed such that a back surface of the second output disc is opposed to a back surface of the first output disc, wherein an output gear configured to output power from the toroidal continuously variable transmission is provided as the integrally rotating member between the first output disc and the second output disc, and annular support spacers are provided as the interposed members between the first output disc and the output gear and between the second output disc and the output gear, respectively.

8. The toroidal continuously variable transmission as claimed in claim 7, wherein a first input disc fixing member and a second input fixing member configured to fix the first input disc and the second input disc in the axial direction are provided as the integrally rotating members at the back surface side of the first input disc and the back surface side of the second input disc, respectively, and annular washers are provided as the interposed members between the first input disc and the first input disc fixing member and between the second input disc and the second input disc fixing member, respectively.

9. A toroidal continuously variable transmission comprising:

at least one transmission unit including:
an input disc and an output disc disposed coaxially with each other; and
a power roller tiltably interposed between the input disc and the output disc and configured to transmit a driving force from the input disc to the output disc;
an integrally rotating member disposed so as to be spaced apart in an axial direction from at least one disc of the input disc and the output disc in each transmission unit and configured to rotate together with the at least one disc; and
an annular interposed member interposed between the at least one disc and the integrally rotating member and configured to rotate together with the at least one disc, wherein
the interposed member is formed with a balance adjustment portion capable of adjusting weight balance in a circumferential direction,
the at least one transmission unit includes:
a first transmission unit including:
a first input disc and a first output disc that are respectively the input disc and the output disc disposed coaxially with each other; and
a first power roller that is the power roller tiltably interposed between the first input disc and the first output disc and configured to transmit a driving force from the first input disc to the first output disc;
a second transmission unit disposed coaxially with the first transmission unit, the second transmission unit including:
a second input disc and a second output disc that are respectively the input disc and the output disc disposed coaxially with each other; and
a second power roller that is the power roller tiltably interposed between the second input disc and the second output disc and configured to transmit a driving force from the second input disc to the second output disc, the second transmission unit being disposed such that a back surface of the second output disc is opposed to a back surface of the first output disc; and
the toroidal continuously variable transmission further comprises a bearing configured to rotatably support an output shaft configured to output power from the toroidal continuously variable transmission,
wherein a rotating member of the bearing is disposed as the integrally rotating member at each of a back surface side of the first output disc and a back surface side of the second output disc, and
annular shim plates are provided as the interposed members between the first output disc and the rotating member and between the second output disc and the rotating member, respectively.

10. The toroidal continuously variable transmission as claimed in claim 9, wherein a first input disc fixing member and a second input fixing member configured to fix the first input disc and the second input disc in the axial direction are provided as the integrally rotating members at the back surface side of the first input disc and the back surface side of the second input disc, respectively, and annular washers are provided as the interposed members between the first input disc and the first input disc fixing member and between the second input disc and the second input disc fixing member, respectively.

* * * * *